United States Patent Office 2,963,569
Patented Dec. 6, 1960

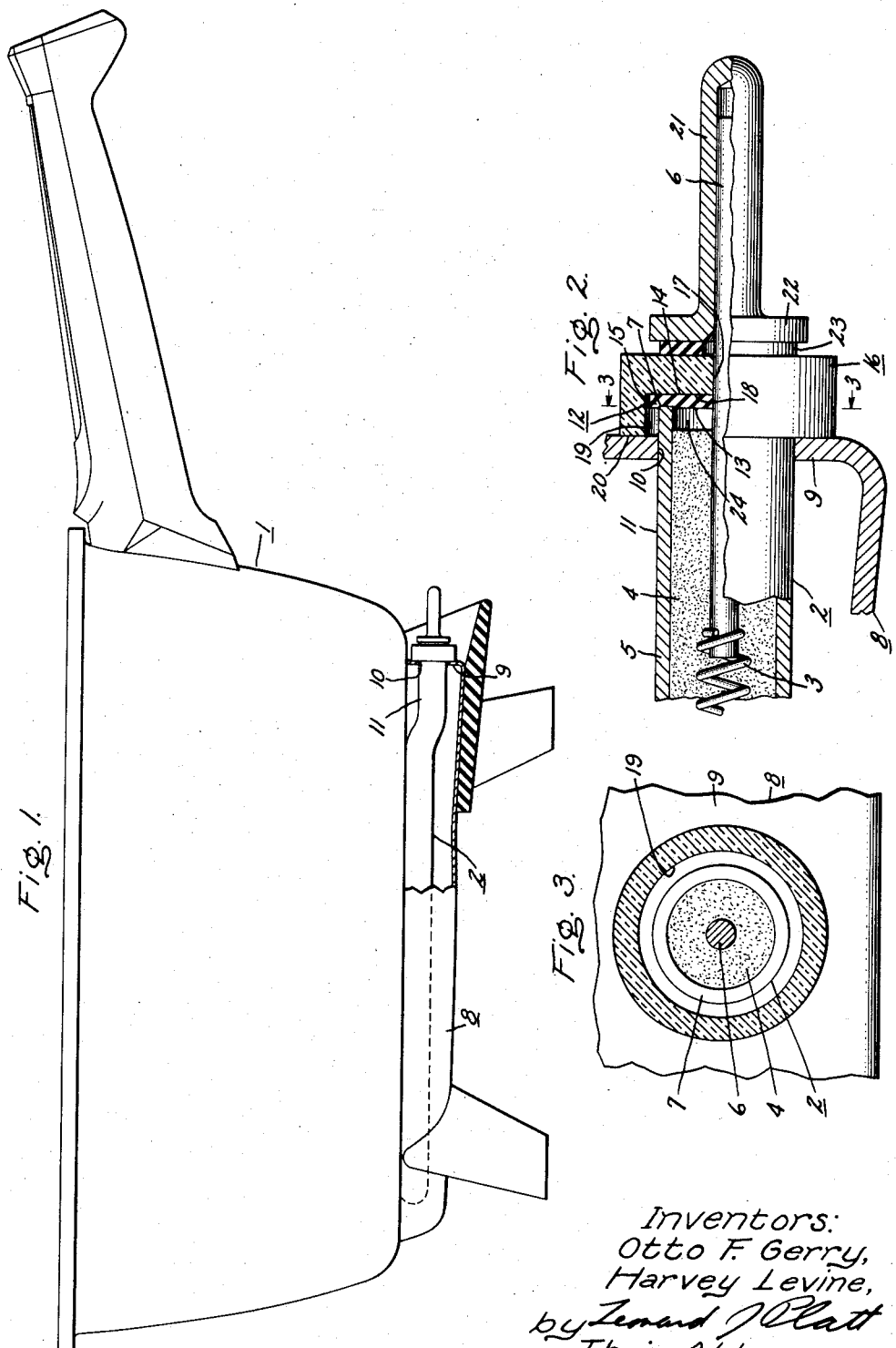
Dec. 6, 1960    H. LEVINE ET AL    2,963,569
WATERTIGHT SEAL FOR COOKING VESSEL HEATING ELEMENT
Filed May 7, 1958
Inventors:
Otto F. Gerry,
Harvey Levine,
by *Leonard J. Platt*
Their Attorney.

2,963,569
WATERTIGHT SEAL FOR COOKING VESSEL HEATING ELEMENT

Harvey Levine, Fairfield, Conn., and Otto F. Gerry, Brockport, N.Y., assignors to General Electric Company, a corporation of New York Filed May 7, 1958, Ser. No. 733,574

3 Claims. (Cl. 219—44)

This invention relates to a watertight seal assembly for an electric cooking vessel and more particularly, to a seal for the end of an electric heating element of the cased or sheathed type, wherein a resistor imbedded in an insulating material is enclosed by an outer metallic protective sheath.

The formation of a satisfactory liquid tight seal of the type mentioned above involves many problems, one of which deals with the expansion and contraction of the cooking vessel and the heating element sheath upon heating and subsequent cooling of the vessel as such expansion and contraction tends to loosen the seal and permit leakage when the vessel is immersed in water for cleaning. Further, when the cooking utensil is being washed and strikes a sink or is subjected to other shock loads the seal is apt to be impaired. Also, where the seal is formed by forceful compression of an unconfined rubber-like washer, the rubber tends to flow at usual cooking temperatures as to take permanent set, which may result in impairment of the seal.

Accordingly, it is a primary object of this invention to provide a new and improved liquid tight seal for the end of an electric cooking vessel heating element of the sheathed type which avoids the above-mentioned difficulties.

In accordance with one aspect of this invention, a resilient washer surrounds a cold terminal portion of a resistor with one flat surface thereof in compression against the end surface of a metallic sheath. A cup-shaped bushing also surrounds the terminal portion of the resistor with the bottom inner surface of the bushing in contact with the other flat surface of the washer and the inner side surface of the bushing spaced from the peripheral surface of the washer. A terminal pin is fixed to the terminal portion of the resistor and the washer is compressed and held between the end surface of the metallic sheath and an inner surface of the bushing. By this arrangement, a reliable, effective liquid tight seal is provided for the end of a cooking vessel heating element which is sufficiently rugged to allow the cooking vessel to be immersed for washing without any danger of water leaking past the seal.

Other objects and attendant advantages of this invention will be apparent from the following description taken in connection with the accompanying drawing in which:

Fig. 1 is a side elevational view partially in cross-section of an electric sauce pan provided with the improved seal;

Fig. 2 is an enlarged fragmentary view partially in cross-section of the improved electrical heating element seal; and Fig. 3 is a cross-sectional view of the seal taken on line 3—3 of Fig. 2.

Referring now to the drawing, there is illustrated a cooking vessel 1 having an electric heating element 2 fixed to the underside thereof. As shown in Fig. 2, the heating element 2 comprises a resistor 3 imbedded in a compacted mass of powdered heat refractory insulating material 4, the resistor 3 and insulation 4 being encased by a metallic sheath 5. The insulation may be of any suitable substance, but preferably will be formed of powdered magnesium oxide. This material may be compacted to a hard dense mass having a good heat conductivity in any suitable manner, such as by reducing the diameter of the sheath after the unit has been assembled and the sheath has been loaded with magnesium oxide. The resistor 3 extends through a considerable portion of the length of the sheath 5 and is provided with a cold terminal portion 6 of relatively low resistance. Although sheath 5 may be of any desirable cross-sectional form, preferably it is circular, as shown in Fig. 3; and the cold terminal portion 6 of resistor 3 extends outwardly from a circular end surface 7 of the sheath 5.

A dished bottom cover 8 is secured to the bottom wall of the vessel and cooperates therewith to form an enclosure for heating element 2. The cover 8 includes a generally vertical side wall 9 having an opening 10 formed therein for receiving an end 11 of the heating element 2. As shown in Fig. 2, the circular end surface 7 of sheath 5 extends somewhat beyond the outer surface of vertical side wall 9 for a purpose to be more fully treated hereinafter. The longitudinal axis of sheath 5 is arranged generally perpendicular to wall 9, and a suitable watertight joint is effected between the vertical side wall 9 and the outer surface of sheath 5, as by brazing. In order to render the end 11 of the electric heating element absolutely impervious to the leakage of fluids into sheath 5, a new and improved means is provided for effecting a seal between terminal portion 6 of resistor 3 and tubular sheath 5. This means includes a uniquely positioned and compressed disk-like resilient washer 12. As best seen in Fig. 2, a resilient washer 12 has a flat side surface 13 for engaging circular end surface 7 of sheath 5, and a side surface 14 and a peripheral surface 15 for cooperation with the inside surfaces of a bushing 16 in a manner to be more fully described hereinafter. Washer 12 is also provided with a centrally located hole for closely receiving terminal portion 6 of resistor 3.

Washer 12 is preferably formed of a silicone rubber which is capable of withstanding operating temperatures of approximately 450° F. The rubber washer is sufficiently resilient in order to effect a watertight seal at the smooth circular end surface 7 of sheath 5; however, it is also hard enough so as to substantially maintain its original shape under compression at elevated temperatures. A silicone rubber having a hardness of approximately 75 durometer, Shore A scale, has been found to be particularly desirable.

For the purpose of providing an effective seal in spite of the flowable nature of silicone rubber at elevated pressures and cooking vessel temperatures, a bushing 16 uniquely cooperates with silicone rubber washer 12, vertical wall 9 and other elements of the seal. Bushing 16 is formed of a hard rigid smooth material; completely annealed borosilicate glass having been found to be particularly desirable. According to the invention, bushings 16 is essentially cup-shaped and is provided with a centrally located hole 17 for receiving terminal 6. As shown in Fig. 2, a cylindrical side inner surface 19 of the bushing is spaced from the peripheral surface 15 of the washer. For example, the diameter of the inner surface 19 of the bushing may be .355″ while the outer diameter of the silicone rubber washer is .345″ at room temperature. Bushing 16 also includes a generally flat inner bottom surface 18 for cooperating with side surface 14 of washer 12. This arrangement permits radial expansion of the silicone rubber toward surface 19 and axial expansion of the silicone rubber toward wall 9 at elevated temperatures so that the washer 12 may contract without deformation when it is cooled.

Bushing 16 is also provided with a lip portion 20 for cooperating with vertical wall 9 of cover 8. With this arrangement, bushing 16 may be pressed inwardly by a suitable mass production technique until lip portion 20 thereof engages side wall 9 which results in a controlled predetermined, uniform compression of washer 12. In effect, lip 20 cooperates with vertical side wall 9 to provide stop means for limiting the compression of silicone rubber washer 12, thus, only the correct predetermined amount of pressure may be applied to silicone rubber washer 12 in order to effect a superior seal. Further, since the longitudinal axis of sheath 5 is arranged generally perpendicular to vertical wall 9, when the complete lip surface 20 of bushing 16 is in contact with wall 9, all points on circular end surface 7 of sheath 5 are spaced an equal distance from the inner surface 18 of bushing 16 to effect uniform compression of washer 12. In addition, this flat silicone rubber washer is relatively thin, preferably approximately .038", to thereby minimize any permanent set in the silicone rubber so that it becomes negligible.

Other elements of the improved arrangement for affording a seal at terminal portion 6 include a terminal pin 21 having a flange 22 formed thereon and a sealing washer 23 sandwiched between the adjacent surfaces of flange 22 and bushing 16. Washer 23 is also preferably formed from silicone rubber, and as shown, has a large clearance around cold terminal portion 6 to permit the silicone rubber to expand at elevated temperatures.

One of the most important advantages of the improved watertight seal is that it lends itself to mass production techniques since all of the critical dimensions are built into the elemental parts themselves thereby obviating the necessity for the maintenance of strict assembly procedures and subsequent adjustments. It will be understood that in making the terminal seal all of the elements of the seal are slipped over terminal 6 in the order shown in Fig. 2, and are arranged in substantially concentric relation with sheath 5. This is a relatively simple operation since all of the elements include preformed holes for receiving terminal portion 6 of resistor 3. According to a preferred method, a brazing flux and brazing compound is put into the hole in terminal pin 21 prior to assembly. After assembly, the elements are pushed together until lip portion 20 is in direct contact with vertical wall 9 of cover 8, thus uniformly compressing washer 12 a certain predetermined amount. Then an induction welding coil is slipped over terminal pin 21, and the pin is brazed to the cold end terminal portion 6 of the tubular heating element 2, thereby locking the elements in the desired positions with the washer 12 compressed between the end surface 7 of the sheath 5 and the inner surfaces of bushing 16.

In the illustrated embodiment, the refractory insulating material 4 is not extended to the circular end surface 7 of sheath 5, but is routed out short of end surface 7 to thereby provide a recess 24. All loose magnesium oxide is also removed in order to prevent the inadvertent placement of particles of magnesium oxide on circular sealing surface 7 of sheath 5 tending to impair the seal. With this arrangement, there is positive insurance that the expansion and contraction of sheath 5 with respect to the magnesium oxide will not cause surface 13 of silicone rubber washer 12 to abut the end of the magnesium oxide tending to impair the seal, and recess 24 also serves as a space into which silicone rubber washer 12 can expand at elevated temperatures.

From the foregoing description, it will be appreciated that the improved seal comprises only four parts, two thin silicone washers, a cup-shaped bushing, and a terminal pin 21. It is further obvious that the seal elements require no forming or curing whatsoever after they have been assembled into position and that the only requirement lies in the brazing of the terminal pin 21 to terminal portion 6. Thus, an exceedingly simple, yet effective, terminal seal is obtained.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What we claim as new and desire to secure by Letters Patent of the United States is:

1. A terminal seal for the heating element of an electric cooking vessel comprising: a resistor having a terminal portion; an open end tubular sheath having an end surface, said sheath surrounding said resistor and also its terminal portion in part; insulation in said sheath retaining said resistor in spaced relation within said sheath, said insulation terminating at a distance from the end of said sheath leaving said sheath with an open end recess through which said terminal portion projects; a thin disk-like resilient washer having two flat side surfaces and a peripheral surface, said washer surrounding the terminal portion of said resistor with one side surface thereof in contact with the end surface of the tubular sheath; a rigid cup-shaped bushing having a bottom inner surface and a side inner surface, said bushing surrounding the terminal portion of the resistor with the bottom inner surface of the bushing in contact with the other side surface of the washer; and a terminal pin fixed to the terminal portion of the resistor maintaining said washer compressed between the end surface of the metallic sheath and the bottom inner surface of the bushing, the inner side surface of said bushing being spaced from the peripheral surface of said washer when the washer is in its compressed state.

2. A terminal seal for the heating element of an electric cooking vessel comprising: a resistor having a terminal portion; an open end tubular sheath having a generally circular end surface surrounding said resistor, said terminal portion projecting beyond the open end of said sheath; a compacted mass of refractory insulating material positioned within said sheath and surrounding said resistor, said insulating material terminating at a distance from the end of said sheath leaving said sheath with an open end recess through which said terminal portion projects; a generally flat vertical wall fixed to the cooking vessel and extending generally downwardly therefrom; the end of said tubular sheath extending through said vertical wall and being permanently fixed thereto; a thin disk-like resilient insulating washer surrounding said terminal portion and having one of its sides in contact with the end surface of said sheath; a rigid cup-shaped bushing surrounding said terminal portion and having a bottom inner surface and a side inner surface, said bottom inner surface being in contact with the other side of said washer, and a terminal pin fixed to said terminal portion maintaining said washer compressed between the end surface of said sheath and said bottom inner surface and locking said bushing against axial displacement, the periphery of said washer being spaced from the side inner surface of said bushing when in the compressed state, said cup-shaped bushing having a lip portion, the lip portion of said bushing being forced into contact with said vertical wall by said terminal pin and thereby limiting and uniformly controlling the compression of said washer.

3. A terminal seal as defined in claim 2 including an insulating spacer surrounding said terminal portion and compressed between said terminal pin and said cup-shaped bushing.

References Cited in the file of this patent

UNITED STATES PATENTS

| | | |
|---|---|---|
| 2,489,998 | Charbonneau et al. | Nov. 29, 1949 |
| 2,624,829 | Dzaack | Jan. 6, 1953 |
| 2,780,704 | Charbonneau | Feb. 5, 1957 |
| 2,840,676 | King | June 24, 1958 |
| 2,914,650 | Sheahan | Nov. 24, 1959 |

FOREIGN PATENTS

| | | |
|---|---|---|
| 624,419 | Great Britain | June 8, 1949 |